US009104985B2

(12) United States Patent
Drucker et al.

(10) Patent No.: US 9,104,985 B2
(45) Date of Patent: Aug. 11, 2015

(54) PROCESSING SYSTEM USING METADATA FOR ADMINISTERING A BUSINESS TRANSACTION

(75) Inventors: Travis M. Drucker, Rochester, MN (US); Joel C. Dubbels, Eyota, MN (US); William C. Rapp, Rochester, MN (US); Richard J. Stevens, Rochester, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 13/211,656

(22) Filed: Aug. 17, 2011

(65) Prior Publication Data

US 2013/0046547 A1 Feb. 21, 2013

(51) Int. Cl.
*G06Q 10/10* (2012.01)
*G06Q 30/02* (2012.01)
*G06Q 10/08* (2012.01)
*G06Q 30/06* (2012.01)
*G06Q 10/06* (2012.01)
*G06Q 10/00* (2012.01)

(52) U.S. Cl.
CPC ....................................... *G06Q 10/00* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 5,600,554 A | 2/1997 | Williams | |
| 6,226,745 B1 | 5/2001 | Wiederhold | |
| 6,256,613 B1 | 7/2001 | Falchuk et al. | |
| 6,260,021 B1 | 7/2001 | Wong et al. | |
| 6,401,138 B1 | 6/2002 | Judge et al. | |
| 6,556,698 B1 | 4/2003 | Diano et al. | |
| 6,574,629 B1 | 6/2003 | Cooke et al. | |
| 6,763,344 B1 | 7/2004 | Osentoski et al. | |
| 6,842,736 B1 | 1/2005 | Brzozowski | |
| 6,941,131 B2 | 9/2005 | Roderique | |
| 6,941,313 B2 | 9/2005 | Seliger et al. | |
| 7,043,714 B2 | 5/2006 | Lin et al. | |
| 7,127,448 B1 | 10/2006 | Wong | |
| 7,133,833 B1 | 11/2006 | Chone et al. | |

(Continued)

OTHER PUBLICATIONS

"Accelerating medical research using the swift workflow system", SP Tiberiu, B Clifford, I Foster . . . -Studies in Health . . . 2007- ncbi.nlm.nih.gov.

(Continued)

*Primary Examiner* — Jonathan Ouellette
(74) *Attorney, Agent, or Firm* — Kennedy Lenart Spraggins LLP

(57) ABSTRACT

Administering a business transaction, including: receiving a request for a business transaction, the request containing data to be processed by the business transaction and metadata describing the data and the request; creating, in dependence upon classification rules, the data to be processed by the business transaction, and the metadata describing the data and the request, a business object representing the business transaction; selecting, in dependence upon workflow selection rules and attributes of the business object, one or more workflows to process the data to be processed by the business transaction; processing the data to be processed by the business transaction with the workflows, thereby creating a resultant business object and resultant data; and routing, in dependence upon content routing rules and the attributes of the resultant business object, the resultant data to a destination.

18 Claims, 10 Drawing Sheets

(56) References Cited

U.S. PATENT DOCUMENTS

| | | | |
|---|---|---|---|
| 7,302,609 | B2 | 11/2007 | Matena et al. |
| 7,395,436 | B1 | 7/2008 | Nemovicher |
| 7,406,691 | B2 | 7/2008 | Fellenstein et al. |
| 7,522,175 | B2 | 4/2009 | Morita et al. |
| 7,742,933 | B1 | 6/2010 | Royds |
| 7,864,995 | B2 | 1/2011 | Fidrich et al. |
| 7,930,193 | B2 | 4/2011 | Marx |
| 8,041,749 | B2 | 10/2011 | Beck |
| 8,108,878 | B1 | 1/2012 | Pulsipher |
| 8,145,503 | B2 | 3/2012 | Backhaus et al. |
| 8,195,481 | B2 | 6/2012 | Backhaus |
| 8,380,809 | B2 | 2/2013 | Becker et al. |
| 2002/0035638 | A1 | 3/2002 | Gendron et al. |
| 2003/0013951 | A1* | 1/2003 | Stefanescu et al. ........... 600/407 |
| 2004/0141661 | A1 | 7/2004 | Hanna et al. |
| 2004/0252348 | A1 | 12/2004 | Desai |
| 2005/0028079 | A1 | 2/2005 | Dinh et al. |
| 2005/0192979 | A1 | 9/2005 | Keller et al. |
| 2006/0230072 | A1 | 10/2006 | Partovi et al. |
| 2007/0055977 | A1* | 3/2007 | Becker et al. ................. 719/330 |
| 2007/0136814 | A1 | 6/2007 | Lee et al. |
| 2007/0186106 | A1 | 8/2007 | Ting et al. |
| 2007/0192408 | A1* | 8/2007 | Konig ........................... 709/203 |
| 2007/0292012 | A1 | 12/2007 | Brandon et al. |
| 2008/0046328 | A1 | 2/2008 | Paron et al. |
| 2008/0086526 | A1* | 4/2008 | Jianzhong et al. ............ 709/203 |
| 2008/0126121 | A1* | 5/2008 | Sirohey et al. .................... 705/2 |
| 2008/0140454 | A1 | 6/2008 | Hernandez et al. |
| 2008/0163070 | A1 | 7/2008 | Mahesh et al. |
| 2008/0168567 | A1 | 7/2008 | Hahn et al. |
| 2008/0219557 | A1 | 9/2008 | Dawson et al. |
| 2008/0312963 | A1 | 12/2008 | Reiner |
| 2009/0025063 | A1 | 1/2009 | Thomas |
| 2009/0147988 | A1 | 6/2009 | Jones et al. |
| 2009/0150184 | A1 | 6/2009 | Spahn |
| 2009/0217340 | A1 | 8/2009 | Sitomer et al. |
| 2009/0228299 | A1 | 9/2009 | Kangarloo et al. |
| 2010/0172567 | A1 | 7/2010 | Prokoski |
| 2010/0205485 | A1* | 8/2010 | Tashiro et al. ................... 714/37 |
| 2010/0256994 | A1 | 10/2010 | Eisenberger et al. |
| 2011/0110568 | A1 | 5/2011 | Vesper et al. |
| 2011/0153351 | A1 | 6/2011 | Vesper et al. |
| 2011/0191781 | A1 | 8/2011 | Karanam et al. |
| 2011/0288877 | A1 | 11/2011 | Ofek et al. |
| 2012/0221346 | A1 | 8/2012 | Acker et al. |
| 2012/0221354 | A1 | 8/2012 | Wall |
| 2012/0221535 | A1 | 8/2012 | Dubbels et al. |
| 2012/0221728 | A1 | 8/2012 | Dubbels et al. |
| 2013/0018662 | A1 | 1/2013 | Dubbels et al. |
| 2013/0018693 | A1 | 1/2013 | Dubbels et al. |
| 2013/0018694 | A1 | 1/2013 | Dubbels et al. |
| 2013/0046537 | A1 | 2/2013 | Weeks et al. |
| 2013/0046547 | A1 | 2/2013 | Drucker et al. |
| 2013/0091106 | A1 | 4/2013 | Dubbels et al. |
| 2013/0096951 | A1 | 4/2013 | Dubbels et al. |
| 2013/0185092 | A1 | 7/2013 | Dubbels et al. |
| 2013/0218620 | A1 | 8/2013 | Liu et al. |

OTHER PUBLICATIONS

Globus Medicus-federation of DICOM medical imaging devices into healthcare Grids. SG, JC Silverstein A. Chervenak . . . _Studies in health . . . , 2007- ncbi.nlm.nih.gov.

A medical image archive solution in the cloud CC Teng, J Mitchell, C Walker, A Swan . . . - . . . ICESS), 2010 IEEE . . . ,2010-ieeexplore.ieee.org.

Mobile healthcare information management utilizing Cloud Computing and Android OS C Doukas, T Pilakas . . . -Conf Proc IEEE Eng Med . . . ,2010-arania.cs.ntou.edu.tw.

High-Performance cloud computing: A view of scientific applications C Vecchiola, S. Pandey, R Buyya- . . . Systems, Algorithm, and . . . ,2009-ieeeexplore.ieee.org.

Gridifying a Diffusion Tensor Imaging Analysis Pipeline MWA Caan, FM Vos, AHS can Kampen . . . - . . . and Grid Computing . . . , Univ of Amsterdam Medical Conference, May 17-20, 2010-ieeeexplore.ieee.org.

A knowledge-based imaging informatics approach to managing patients treated with proton beam therapy B Liu, HK Huang, M Law, A Le . . . - . . . Medical Imaging, 2007-spiedigitallibrary.org.

Image-assisted knowledge discovery and decision support in radiation therapy planning BJ Liu, MYY Law, Ja Documet, A Gertych-Computerized Medical Imaging . . . ,2007-Elsevier.

Workflow management for paramedical emergency operations within a mobile-static distributed environment A Riposan, VV Patriciu—Proceeding of the 4$^{th}$ Workshop on Workflows . . . ,2009-DL.acm.org.

Cloud computing: A new business paradigm for biomedical information sharing A Rosenthal, P Mork, MH Li . . . _Journal of . . . 2010-cloud.pubs.dbs.uni-leipzig.de.

Office Action, U.S. Appl. No. 13/035,196, Dec. 20, 2012.
Office Action, U.S. Appl. No. 13/035,229, Mar. 14, 2013.
Office Action, U.S. Appl. No. 13/035,030, Jan. 22, 2013.
Office Action, U.S. Appl. No. 13/181,561, Mar. 29, 2013.
Office Action, U.S. Appl. No. 13/211,656, Apr. 11, 2013.
Office Action, U.S. Appl. No. 13/181,127, Jan. 28, 2013.
Stef-Praun, T., et al., "Accelerating Medical Research using the Swift Workflow System" NIH Public Access Author Manuscript, Available in PMC May 2, 2009, pp. 207-216, Published in final edited form as: Studies in Health Technology and Informatics, vol. 126, 2007, NIH, Bethesda, MD, USA. PMCID: PMC2676238, URL: http://www.ncbi.nlm.nih.gov/pmc/articles/PMC2676238/.
Final Office Action, U.S. Appl. No. 13/035,196, Oct. 9, 2013.
Office Action, U.S. Appl. No. 13/035,196, Jun. 26, 2013.
Final Office Action, U.S. Appl. No. 13/035,000, Aug. 27, 2013.
Office Action, U.S. Appl. No. 13/035,000, May 17, 2013.
Office Action, U.S. Appl. No. 13/035,229, Sep. 6, 2013.
Final Office Action, U.S. Appl. No. 13/035,030, May 30, 2013.
Office Action, U.S. Appl. No. 13/181,245, Aug. 28, 2013.
Final Office Action, U.S. Appl. No. 13/211,656, Aug. 13, 2013.
Final Office Action, U.S. Appl. No. 13/181,127, Jul. 15, 2013.
Final Office Action, U.S. Appl. No. 13/688,914, Oct. 9, 2013.
Office Action, U.S. Appl. No. 13/688,914, Jun. 27, 2013.
Office Action, U.S. Appl. No. 13/690,741, Aug. 29, 2013.

* cited by examiner

Medical Image Business Object 118

Request ID 302
Request Type 304
Action ID 306
Provider ID 308
Patient ID 310
Physician ID 312
Technician ID 314
Scanner ID 316
Scanner Type 318
Image ID 320
Image Type 322
Patient Location 324
Destination Location 326
Receiving Gateway ID 328
Destination Gateway ID 330

Original Image Pointer 332
Interim Image Pointer 334
Resultant Image Pointer 336

Image Provider Protocol 338

FIG. 3

PROCESSING SYSTEM USING METADATA FOR ADMINISTERING A BUSINESS TRANSACTION

BACKGROUND OF THE INVENTION

1. Field of the Invention

The field of the invention is data processing, or, more specifically, methods, apparatus, and products for administering a business transaction.

2. Description of Related Art

Current medical image management systems are inflexible and do not support a model of accessing any and all medical images produced across a multi-facility enterprise. This causes the data from analyzing these images to be difficult to share and difficult to produce.

SUMMARY OF THE INVENTION

Methods, systems, and computer program products are provided for administering a business transaction, including: receiving a request for a business transaction, the request containing data to be processed by the business transaction and metadata describing the data and the request; creating, in dependence upon classification rules, the data to be processed by the business transaction, and the metadata describing the data and the request, a business object representing the business transaction; selecting, in dependence upon workflow selection rules and attributes of the business object, one or more workflows to process the data to be processed by the business transaction; processing the data to be processed by the business transaction with the workflows, thereby creating a resultant business object and resultant data; and routing, in dependence upon content routing rules and the attributes of the resultant business object, the resultant data to a destination.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 sets forth a block diagram of an example medical image business object according to embodiments of the present invention.

DETAILED DESCRIPTION OF EXEMPLARY EMBODIMENTS

Figure 1:
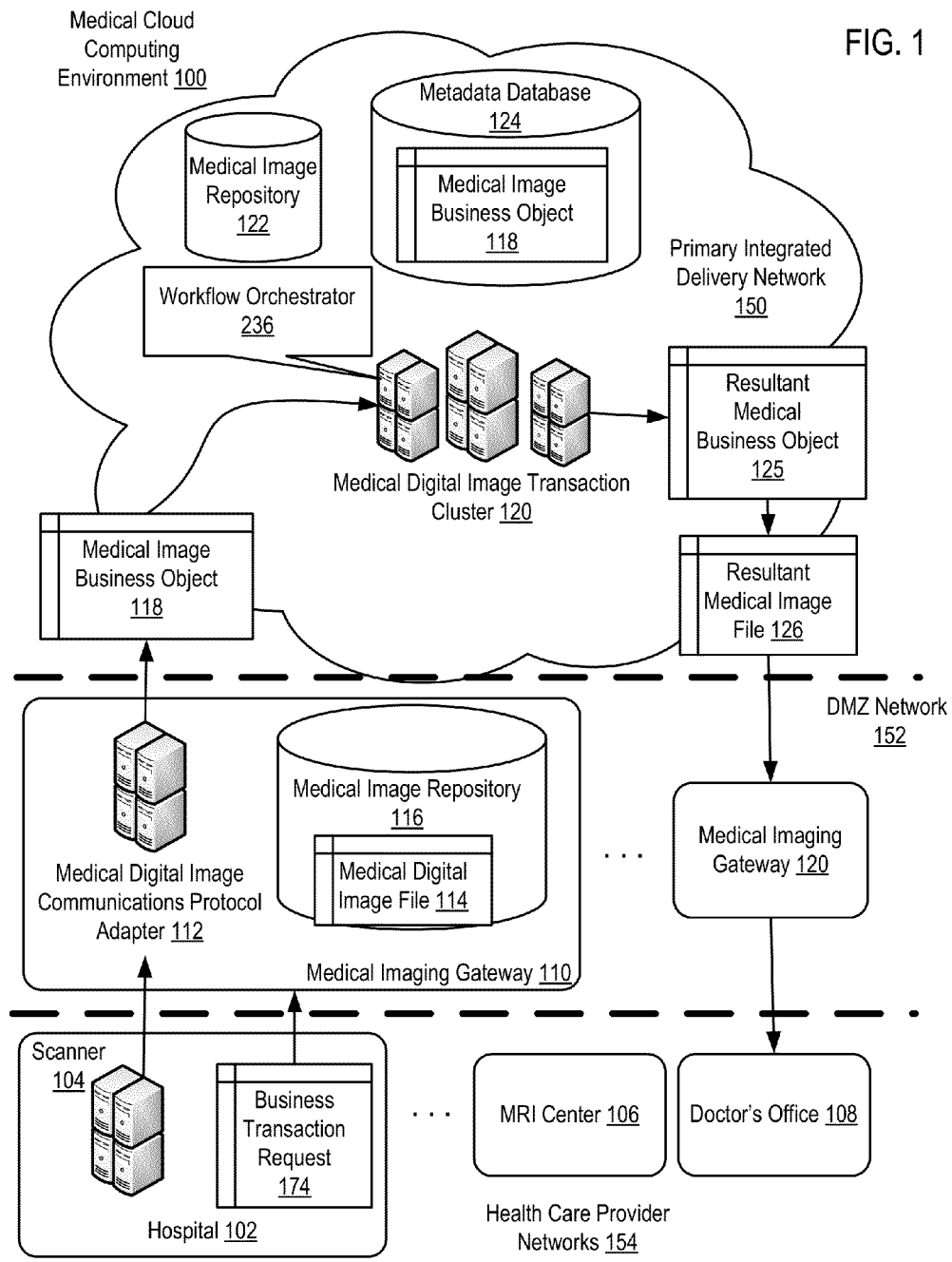
FIG. 1 sets forth a network diagram of a system for administering a medical digital images in a distributed medical digital image computing environment and administering a business transaction according to embodiments of the present invention.

Exemplary methods, systems, and products for administering a business transaction in accordance with the present invention are described with reference to the accompanying drawings, beginning with FIG. 1. FIG. 1 sets forth a network diagram of a system for administering medical digital images in a distributed medical digital image computing environment and administering a business transaction according to embodiments of the present invention. The system of FIG. 1 includes a distributed processing system implemented as a medical cloud computing environment (100). Cloud computing is a model of service delivery for enabling convenient, often on-demand network access to a shared pool of configurable computing resources. Examples of computing resources that may be accessed include computer networks, network bandwidth, servers, processing capabilities, computer memory, software applications, virtual machines, and services that can be rapidly provisioned and released with reduced management effort or interaction with the provider of the service. Cloud models can include five characteristics, three service models, or four deployment models.

Characteristics of the cloud model can include on-demand self-service, broad network access, resource pooling, rapid elasticity, and measured service. On-demand self-service is a characteristic in which a cloud consumer can unilaterally provision computing capabilities, such as server time and network storage, as needed automatically without requiring human interaction with the cloud service provider.

Broad network access is a characteristic describing capabilities that are available over a network. The capabilities may be accessed through standard mechanisms that promote use by heterogeneous thin or thick client platforms such as mobile phones, laptops, desktop computers, PDAs, and so on as will occur to those of skill in the art.

Resource pooling is a characteristic in which the cloud service provider's computing resources are pooled to serve multiple consumers using a multi-tenant model, with different physical and virtual resources dynamically assigned and reassigned according to demand. There may be a sense of location independence in that the consumer generally has no control or knowledge over the exact location of the provided resources but may be able to specify a location at a higher level of abstraction such as the country, state, datacenter and so on.

Rapid elasticity is a characteristic in which the capabilities of the cloud computing environment can be rapidly and elastically provisioned, in some cases automatically, to quickly scale out and rapidly released to quickly scale in. To the consumer of the cloud computing environment, the capabilities available for provisioning often appear to be unlimited and appear to be able to be purchased in any quantity at any time.

Measured service is a characteristic in which cloud systems automatically control and optimize resource use by leveraging a metering capability at some level of abstraction appropriate to the type of service such as storage, processing, bandwidth, active user accounts, and so on. Resource usage can be monitored, controlled, and reported providing transparency for both the provider and consumer of the utilized service.

Cloud models can include three service models. Examples of service models implemented in the cloud computing environment can include software as a service ('SaaS'), platform as a service ('PaaS') and infrastructure as a service ('IaaS'). SaaS typically provides the capability to the consumer to use the provider's applications running on a cloud infrastructure. The applications can be accessible from various client devices through a thin client interface such as a web browser, web-based e-mail client, and so on. The consumer may not manage or control the underlying cloud infrastructure including network, servers, operating systems, storage, or even individual application capabilities, with the common possible exception of limited user-specific application configuration settings.

PaaS typically includes the capability provided to the consumer to deploy onto the cloud infrastructure consumer-created or acquired applications created using programming languages and tools supported by the cloud service provider. The consumer often does not manage or control the underlying cloud infrastructure including networks, servers, operating systems, or storage, but has control over the deployed applications and possibly application hosting environment configurations.

IaaS typically includes the capability provided to consumers to provision processing, storage, networks, and other fundamental computing resources where the consumers are able to deploy and run arbitrary software, which can include operating systems and applications. The consumers often do not manage or control the underlying cloud infrastructure but have control over operating systems, storage, deployed applications, and possibly limited control of select networking components such as, for example, host firewalls.

Cloud models can include four deployment models. Example deployment models used in cloud computing environments can include private clouds, community clouds, public clouds, and hybrid clouds. In a private cloud deployment model, the cloud infrastructure can be operated solely for an organization. The cloud infrastructure may be managed by the organization or a third party and may exist on-premises or off-premises. In the community cloud deployment model, the cloud infrastructure is shared by several organizations and supports a specific community that has shared concerns such as, for example, mission, security requirements, policy, compliance considerations, and so on. The cloud infrastructure may be managed by the organizations or a third party and may exist on-premises or off-premises. In the public cloud deployment model, the cloud infrastructure is made available to the general public or a large industry group and is owned by an organization selling cloud services. In the hybrid cloud deployment model, the cloud infrastructure is a composition of two or more clouds, such as private, community, public, that remain unique entities but are bound together by standardized or proprietary technology that enables data and application portability such as, for example, cloud bursting for load-balancing between clouds.

A cloud computing environment is generally considered service oriented with a focus on statelessness, low coupling, modularity, and semantic interoperability. At the heart of cloud computing is an infrastructure comprising a network of interconnected nodes. The distributed processing computing environment of FIG. 1 includes a medical imaging cloud computing environment (100). The medical imaging cloud computing environment (100) of FIG. 1 is capable of administering medical digital images according to embodiments of the present invention. In the example of FIG. 1 the medical imaging cloud computing environment (100) includes two networks: a primary integrated delivery network (150) and a DMZ network (152). The primary integrated delivery network (150) of FIG. 1 is a highly secure network for administering image processing transactions upon medical images according to aspects of embodiments of the present invention. The DMZ network (152), or demilitarized zone, of FIG. 1 is a physical or logical subnetwork that contains and exposes the medical imaging cloud computing environment's external services to the larger untrusted network, such as the Internet, through which the health care provider networks (154) may access the services of the medical imaging cloud computing environment. The DMZ network (152) of FIG. 1 adds an additional layer of security to the medical imaging cloud because an external attacker only has access to equipment in the DMZ, rather than any other part of the medical imaging cloud.

The medical cloud computing environment (100) of FIG. 1 includes medical imaging cloud gateway (110) in the DMZ network (152). The medical imaging cloud gateway (110) in the DMZ network (152) includes a medical digital image communications protocol adapter (112). The medical digital image communications protocol adapter (112) may be embodied as a module of automated computing machinery that is capable of receiving a medical digital image from a provider of medical images. Providers of medical images can include a hospital (102), an MRI center (106), a doctor's office, and others as will occur to those of skill in the art. The medical digital image communications protocol adapter (112) is capable of receiving the medical image according to any number of protocols supported by the providers of the medical images such as Digital Imaging and Communications in Medicine ('DICOM'), Health Level Seven ('HL7'), and others as will occur to those of skill in the art.

DICOM is a standard for handling, storing, printing, and transmitting information in medical imaging. DICOM includes a file format definition and a network communications protocol. The communication protocol is an application protocol that uses TCP/IP to communicate between systems. DICOM files can be exchanged between two entities that are capable of receiving image and patient data in DICOM format. DICOM enables the integration of scanners, X-ray machines, cameras, ultrasound machines, servers, workstations, printers, and network hardware from multiple manufacturers into a picture archiving and communication system ('PACS').

HL7 is an all-volunteer, non-profit organization involved in development of international healthcare standards. HL7 is also used to refer to some of the specific standards created by the organization. HL7 and its members provide a framework and related standards for the exchange, integration, sharing, and retrieval of electronic health information.

In the example of FIG. 1 a medical image is created by scanner (104) in a hospital (102) and sent to the medical imaging cloud gateway (110) according to a protocol supported by the hospital (102). The medical images commonly range in size from 50 to 500 kilobytes, although the medical images may be larger and smaller. Each image is often called a slice and many slices together make a series of images that are processed together for medical treatment. A series may contain a single image or thousands of images. Examples of scanners useful in producing medical images according to embodiments of the present invention include magnetic resonance scanners, computed tomography scanners, digital radiography scanners and many others as will occur to those of skill in the art. Many manufacturers produce such scanners such as General Electric, Siemens, and others. The example of a scanner (104) in a hospital (102) is for explanation and not for limitation. In fact, medical images that may be administered according to embodiments of the present invention may be created in any health care setting such as clinics, MRI centers (106), doctor's offices (108) and many others as will occur to those of skill in the art.

The medical digital image communications protocol adapter (112) of FIG. 1 receives a request for an image processing transaction to process the medical digital image. The request is transmitted according to one of a plurality of a medical image communications protocol supported by medical digital image communications protocol adapter and used by a producer of the medical images. The request may be received according to any number of protocols supported by the provider of the digital image such as DICOM, HL7, and others as will occur to those of skill in the art. The request received in the medical digital image protocol adapter (112) contains a medical image to be processed, metadata describing the medical image, and an identification of the processing to be performed on the image.

An image processing transaction is request to perform one or more image processing workflows on one or more medical images in the medical imaging cloud computing environment. A workflow is typically implemented as one or more services that are reusable components of a data processing system. The services of the workflow are bound together and executed to carry out the workflow. Such workflows can include analytics for tumor detection, tumor growth, aneurysm detection, vessel separation in a patients head, and many other medical conditions, workflows for image compression, image resolution, distribution of images, and so on. Many other workflows for medical image processing will occur to those of skill in the art.

The medical digital image communications protocol adapter (112) of FIG. 1 parses the request according to the contents of the request and the structure of the request. The structure of the request may be defined by the protocol and standard in which the request was created. The medical digital image communications protocol adapter (112) of FIG. 1 may extract one or more the medical images associated with the request and also extract metadata describing the request and the medical images.

The medical digital image communications protocol adapter (112) of FIG. 1 creates a medical image business object representing the business transaction. A medical image business object is a data structure that represents the requested business transaction. The medical image business object includes metadata describing the request and the medical images processed in the requested transaction. The medical image business object has predefined structure. In some embodiments the medical image business object may be implemented as an XML file or other structured documents.

In the example of FIG. 1, the medical digital image communications protocol adapter (112) can create a medical image business object in dependence upon classification rules and the contents of the request. Classification rules are rules that are tailored to parsing the request according to the protocol and standard in which in which the request was created. The classification rules may be used to parse the request for the purpose of extracting medical images and metadata that are contained in the request. The classification rules are also tailored to develop the medical image business object by including the extracted images and metadata in a predefined structure in the medical image business object. Classification rules allow for disparate metadata, arriving in disparate protocols and standards, to be read, understood, classified, and organized according to a defined structure for the medical image business object.

In the example of FIG. 1, the medical image communications protocol adapter (112) sends the medical image business object to a medical digital image transaction cluster (120). The medical digital image transaction cluster (120) may be configured to store the medical image business object in a medical image metadata database. In the example of FIG. 1, the medical image metadata database may be embodied, for example, as a relational database configured to store and provide access to medical image metadata such as the medical image business object.

In the example of FIG. 1, the medical image communications protocol adapter (112) may store the medical images (114) locally in a medical image repository on the medical imaging gateway. Alternatively, the medical image communications protocol adapter (112) may send the medical images (114) to the medical digital image transaction cluster (120), which may store the images in a medical image repository (122) in the primary integrated delivery network (150). In the example of FIG. 1, the medical image repository (122) may be embodied as any form of persistent computer memory configured to receive and provide access to medical images.

The medical digital image transaction cluster (120) of FIG. 1 may select, in dependence upon workflow selection rules and the attributes of the medical image business object, one or more medical analytic workflows to process the medical image. Workflow selection rules are rules that are tailored to carrying out the image processing transaction on the medical images and the medical image business object according to the request received by the health care provider. The workflow selection rules can identify the necessary requirements of the transaction and select workflows having services that carry out those requirements. The workflow selection rules may also select workflows that are tailored for the attributes of medical images that are to be processed. Examples of such attributes include the slice size of a medical image, the number of slices that comprise the medical image, the type of scanner used to create the images, and so on. Workflows may include analytics for tumor detection, tumor growth, aneurysm detection, vessel separation in a patients head, and many other medical conditions. Workflows may also exist for image compression, image resolution, image distribution, and so on.

The medical digital image transaction cluster (120) of FIG. 1 process the medical image of the request with the medical analytic workflows, thereby creating a resultant business object (125) and resultant medical image (126). Processing the medical image is typically carried out by executing the selected medical analytic workflows and creating results for transmission to the health care provider. In the example of FIG. 1, the resultant medical image (126) may be a medical image that is produced by executing the one or more workflows using medical images contained in the request as input to the one or more workflows.

The medical digital image transaction cluster (120) of FIG. 1 routes, in dependence upon content routing rules and the attributes of the resultant business object, the resultant medical image (126) to one or more destinations. Examples of destinations in FIG. 1 include the hospital (102), the MRI center (106), the doctor's office (108), each of which may be in one or more networks for health care providers (154). The example destinations of FIG. 1 are for explanation and not for limitation. In fact, embodiments of the present invention may route the resultant medical image to many different destinations such as other hospitals, clinics, houses of doctors, patients, technicians, workstations, PDAs and many others as will occur to those of skill in the art.

In the example of FIG. 1, the resultant medical image (126) may be routed to one or more destinations in dependence upon content routing rules. In the example of FIG. 1, content routing rules are rules dictating the manner in which resultant medical images are routed to the destination. Such rules are often based on the content of the resultant medical image such that the image is routed to an appropriate health care provider in a manner that conforms to both security and privacy requirements. Often the destination of the image is a different location, logical or physical, from the provider of the original medical image prior to its being processed by the medical digital image transaction cluster. Content routing rules may also dictate the manner in which the health care provider may access the resultant medical images and who may access such images. Routing the resultant medical image to one or more destinations according to the example of FIG. 1 can include extracting metadata from the resultant business object, creating a response to the request the response conforming to a particular digital image communications protocol used for the destination, and transmitting the response according to the particular digital image communications protocol supported by the destination such as, for example, DICOM, HL7, and others as will occur to those of skill in the art.

Routing the resultant medical image to one or more destinations may also include sending a notification describing the resultant medical image to the destination. Examples of such a notification include an email message or a text message that is sent to a health care provider notifying the health care provider that the response to the request is ready for viewing. The notifications may also include information indicating that the workflows processing the medical images identified aspects of the images that are consistent with a medical condition such as tumor, aneurism, vessel separation, and so on.

The medical cloud computing environment (100) of FIG. 1 is not limited to administering medical images. The medical cloud computing environment (100) is also useful in administering a business transaction according to embodiments of the present invention. In the example of FIG. 1, the medical imaging gateway (110) receives from a user a request (174) for execution of a business transaction within the medical cloud computing environment (100). For example, the medical imaging gateway (110) may receive from a user a request (174) to generated and transmit billing information over the medical cloud computing environment (100). The request (174) may include data to be processed by a business transaction and metadata describing the data and the request (174). The medical imaging gateway (100) is capable of receiving the request (174) for execution of a business transaction according to a number of protocols. In the example of FIG. 1, the medical imaging gateway (110) sends the request (174) for execution of a business transaction to the medical digital image transaction cluster (120) of the primary integrated delivery network (150).

The example of FIG. 1 includes a workflow orchestrator (236) in the medical digital image transaction cluster (120). In the example of FIG. 1, the workflow orchestrator (236) is a module of automated computing machinery for identifying workflows that are used to carry out a business transaction, organizing the workflows to carry out a business transaction, and executing a business transaction by utilizing the workflows. The workflow orchestrator (236) may include special purpose computer program instructions for identifying workflows that are used to carry out a business transaction, organizing the workflows to carry out a business transaction, and executing a business transaction by utilizing the workflows, and so on.

In the example of FIG. 1, the workflow orchestrator (236) creates a business object representing the business transaction. The business object may be embodied, for example, as a data structure that includes information describing the business transaction to be carried out. The business object may include, for example, a listing of one or more workflows that will be used to carry out a particular business transaction, a pointer to data that is to be used as input to the one or more workflows, an identification of one or more receipts of the output created by executing the one or more workflows, and so on. Such a business object may be created in dependence upon classification rules, the data to be processed by the business transaction, and the metadata describing the data and the request (174).

In the example of FIG. 1, the workflow orchestrator (236) also selects, in dependence upon workflow selection rules and attributes of the business object, one or more workflows to process the data to be processed by the business transaction. For example, if the business object identifies a data type of input parameters for the one or more workflows and a preferred data type of output generated by executing the one or more workflows, the workflow orchestrator (236) may therefore select a first workflow that not only takes input parameters of the particular type identified in the business object, but also is capable of generating output of the particular data type identified in the business object, either alone or in combination with other workflows.

In the example of FIG. 1, the workflow orchestrator (236) also processes the data to be processed by the business transaction with the one or more selected workflows, thereby creating a resultant business object and resultant data. In the example of FIG. 1, executing the first workflow may be carried out, for example, by the workflow orchestrator (236) calling the first workflow and passing information included in the request (174) for execution of a business transaction to the workflow as an input parameter. In the example of FIG. 1, the resultant data is the output executing the one or more workflows.

In the example of FIG. 1, the workflow orchestrator (236) also routes the resultant data to one or more destinations. The destination may be embodied, for example, as a medical imaging database or other computing system. In the example of FIG. 1, the workflow orchestrator (236) may route the resultant data to one or more destinations in dependence upon content routing rules and the attributes of the resultant business object. Content routing rules may be embodied, for example, as computer program instructions that when executed identify a destination that is to receive content. The content routing rules may apply a set of selection criteria to identify a particular destination from among a group of possible destinations. For example, the content routing rules may select destinations based on the nature of the content to be routed, based on the available communications channels that a destination may receive content over, based on the nature of the destination itself, and so on.

The arrangement of servers and other devices making up the exemplary system illustrated in FIG. 1 are for explanation, not for limitation. Data processing systems useful according to various embodiments of the present invention may include additional servers, routers, other devices, peer-to-peer architectures, databases containing other information, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Figure 2:
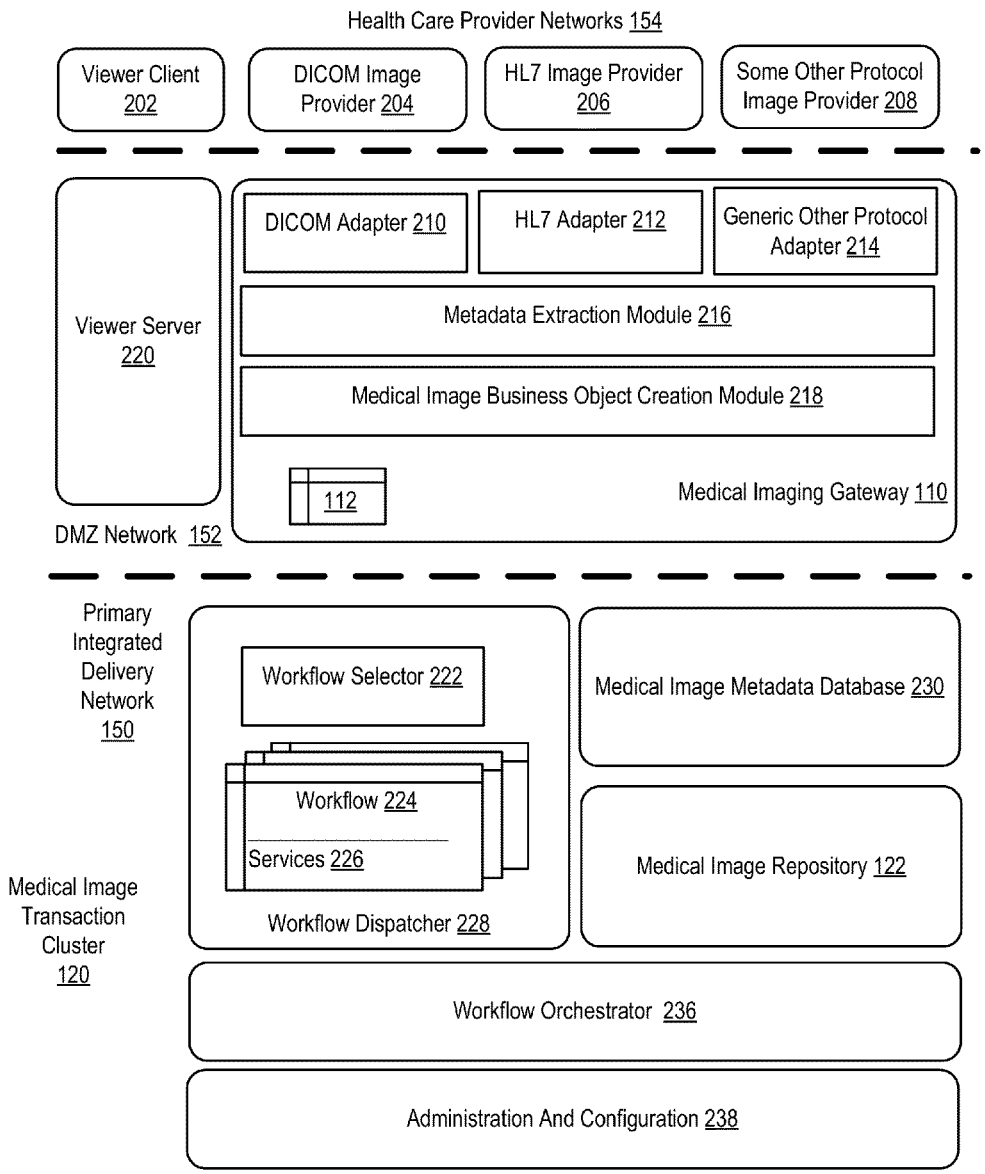
FIG. 2 sets forth an example system for administering medical digital images and administering a business transaction in a distributed medical computing environment.

For further explanation, FIG. 2 sets forth an example system for administering medical digital images and administering a business transaction in a distributed medical computing environment (200). The medical computing environment of FIG. 2 includes two networks, a DMZ network (152) and a primary integrated delivery network (105). The distributed medical computing environment (200) administers medical digital images for a number of health care providers who provide medical images and receives the results of imaging transactions processed on those medical images, and also dynamically allocates business workflows, according to embodiments of the present invention. The distributed medical computing environment may be implemented as a cloud computing environment that is accessible to the health care providers through the health care provider networks (154).

The example distributed medical image computing environment (200) of FIG. 2 includes a medical gateway (110), a module of automated computing machinery that includes a DICOM adapter (210), an HL7 adapter (212), generic other protocol adapter, a metadata extraction module (216) and a medical image business object creation module (218). The medical imaging gateway (110) of FIG. 2 receives, in one of the medical digital image communications protocol adapter (210, 212, 214), a request for an image processing transaction to process the medical digital image. The request contains a medical image to be processed, metadata describing the medical image, and an identification of the processing to be performed on the image.

The request is transmitted according to one of a plurality of a medical image communications protocol supported by medical digital image communications protocol adapter and used by a producer of the medical images. For example, the medical imaging gateway (110) of FIG. 2 is capable of receiving a request for an image processing transaction from a health care provider (204) according to the DICOM standard, the HL7 standard, and other protocols and standards for creating and transmitted medical digital images. In the example of FIG. 2, the DICOM adapter (210) is capable of receiving and parsing the request according to the DICOM standard, the HL7 Adapter (212) is capable of receiving and parsing the request according the HL7 standard, and the generic other protocol adapter (214) is capable of receiving and parsing the request according to some other protocol that will occur to those of skill in the art.

The metadata extraction module (216) of FIG. 2 extracts the metadata from the parsed request according to the standards and protocol used to create and transmit the request. The metadata extraction module (216) of FIG. 2 may also be configured to provide the extracted metadata to the medical image business object creation module. The medical image business object creation module in turn creates, in dependence upon classification rules and the contents of the request, a medical image business object (112) representing the business transaction. The medical image business object includes a predefined structure and may be implemented as a structured document such as an XML document.

The medical imaging gateway (110) of FIG. 2 sends the medical image business object (112) to a medical image transaction cluster (120) in the primary integrated delivery network. The medical image transaction cluster (120) includes a workflow dispatcher (228), a medical image metadata database (230), a medical image repository (122), a security module (232), and a medical imaging cloud computing administration and configuration module (238). The workflow dispatcher (228) can receive the medical image business object and store the medical image business object (112) in the medical image metadata database (230). The workflow dispatcher (228) can also receive medical images and store the medical image in the medical image repository (122).

The workflow dispatcher (228) of FIG. 2 may also include a workflow selector (222) that selects, in dependence upon workflow selection rules and the attributes of the medical image business object, one or more medical analytic workflows to process the medical image. As described above, workflow selection rules are rules that are tailored to carrying out the image processing transaction on the medical images and the medical image business object according to the request received by the health care provider. The workflow selection rules can identify the necessary requirements of the transaction and select workflows having services that carry out those requirements. The workflow selection rules may also select workflows that are tailored for the attributes of medical images that are to be processed.

The workflow dispatcher (228) of FIG. 2 may also process the medical image of the request with the medical analytic workflows, thereby creating a resultant business object and resultant medical image. Processing the medical image is typically carried out by executing the selected medical analytic workflows and creating results for transmission to the health care provider. In the example of FIG. 2, the resultant medical image may be a medical image that is produced by executing the one or more workflows using medical images contained in the request as input to the one or more workflows.

The workflow dispatcher (228) may also route, in dependence upon content routing rules and the attributes of the resultant business object, the resultant medical image to one or more destinations. The workflow dispatcher (228) of FIG. 2 routes the resultant medical image to one or more destinations by extracting metadata from the resultant business object, creating a response to the request the response conforming to a particular digital image communications protocol used for the destination, and transmitting the response according to the particular digital image communications protocol. The workflow dispatcher (228) of FIG. 2 may route the resultant medical image to one or more destinations by storing the resultant medical image on the medical imaging gateway (110) assigned to the destination of the medical image. The workflow dispatcher may then transmit in the response data access information to access the resultant medical image on the gateway. A health care provider may then view the resultant medical images using the viewer server (220) in the DMZ network (152) through the use of a viewer client (202) at the health care provider's location.

The distributed medical computing environment (200) is also capable of administering a business transaction according to embodiments of the present invention. In the example of FIG. 2, the workflow orchestrator (236) is a module of automated computing machinery for identifying workflows that are used to carry out a business transaction, organizing the workflows to carry out a business transaction, and executing a business transaction by utilizing the workflows. The workflow orchestrator (236) may include special purpose computer program instructions for identifying workflows that are used to carry out a business transaction, organizing the workflows to carry out a business transaction, and executing a business transaction by utilizing the workflows, and so on.

In the example of FIG. 2, the workflow orchestrator (236) receives a request for a business transaction. In the example of FIG. 2, the request includes data to be processed by the business transaction and metadata describing the data and the request. The workflow orchestrator (236) subsequently creates a business object representing the business transaction. The workflow orchestrator (236) also selects, in dependence upon workflow selection rules and attributes of the business object, one or more workflows to process the data to be processed by the business transaction. For example, if the business object identifies a data type of input parameters for the one or more workflows and a preferred data type of output generated by executing the one or more workflows, the workflow orchestrator (236) may therefore select a first workflow that not only takes input parameters of the particular type identified in the business object, but also is capable of generating output of the particular data type identified in the business object, either alone or in combination with other workflows.

In the example of FIG. 2, the workflow orchestrator (236) also processes the data to be processed by the business transaction with the one or more selected workflows, thereby creating a resultant business object and resultant data. In the example of FIG. 2, executing the first workflow may be carried out, for example, by the workflow orchestrator (236) calling the first workflow and passing information included in the request for execution of a business transaction to the workflow as an input parameter. In the example of FIG. 2, the resultant data is the output executing the one or more workflows. In the example of FIG. 2, the workflow orchestrator (236) also routes the resultant data to one or more destinations.

For further explanation, FIG. 3 sets forth a block diagram of an example medical image business object (118) according to embodiments of the present invention. The medical image business object (118) of FIG. 3 includes a request ID (302). In the example of FIG. 3, the request ID (302) can include an identification of the particular request for a medical image processing transaction. The medical image business object (118) of FIG. 3 includes a request type (304). The request type (304) of FIG. 3 can identify the kind of image processing transaction being requested.

The medical image business object (118) of FIG. 3 also includes an action ID (306). The action ID (306) of FIG. 3 can identify a particular action or workflow to be executed in the image processing transaction. The medical image business object (118) of FIG. 3 also includes a provider ID (308) identifying the provider of the medical images to be processed in the image transaction. The medical image business object (118) of FIG. 3 further includes image provider protocol (338) that identifies the protocol and standard in which the images and request were created such as DICOM, HL7, and so on as will occur to those of skill in the art.

The medical image business object (118) of FIG. 3 includes a patient ID (310) that identifies the patient. An identification of the patient may include a name, social security number or other unique identification of the patient. The medical image business object (118) of FIG. 3 also includes a physician ID (312) identifying a physician associated with the patient and a technician ID (314) identifying one or more technician that performed the scan to create the medical images associated with the request.

The medical image business object (118) of FIG. 3 includes a scanner ID (316) identifying the scanner used to produce the medical images associated with the request. The identification of the scanner can include a manufacturer name, serial number of the scanner or any other identification that will occur to those of skill in the art. The medical image business object (118) of FIG. 3 also includes a scanner type (318) identifying the type of scanner such as magnetic resonance scanners, computer tomography scanners, digital radiography scanners and so forth as will occur to those of skill in the art.

The medical image business object (118) of FIG. 3 includes an image ID (320) identifying the medical image. The image ID (320) may also identify the image and the series of images that the image is a part of. The medical image business object (118) of FIG. 3 also includes an image type (322) that identifies the type of image. The type of image may also identify the type of images in a series of images.

The medical image business object (118) of FIG. 3 also includes a patient location (324) and a destination location (326). In the example of FIG. 3, the patient location (324) can identify the location of the patient and the destination location (326) can identify the location to which the processed resultant medical images and associated notifications are to be sent.

The medical image business object (118) of FIG. 3 also includes a receiving gateway ID (328). The receiving gateway ID (328) can identify the medical imaging gateway in the medical imaging cloud computing environment in which the request for the imaging transaction was received. The medical image business object (118) of FIG. 3 also includes a destination gateway ID (330). The destination gateway ID (330) can identify the medical imaging gateway in the medical imaging cloud computing environment to which a response to a request, the resultant processed images, and any notifications are to be sent.

The medical image business object (118) of FIG. 3 includes an original image pointer (332) that points to the original images or series of images in data storage in the medical imaging cloud computing environment. In some embodiments, the original images may be stored on the medical imaging gateway that received the request for the transaction. The medical image business object (118) of FIG. 3 includes an interim image pointer (334) that points to the current state of an image or series of images during the execution of the imaging transaction. Such images may be interim in the sense that some of the workflows for the images have been executed but the image transaction is not complete. The medical image business object (118) of FIG. 3 includes a resultant image pointer (336) that points to the resultant image after completion of the image transaction. The fields and structure of the medical image business object (118) of FIG. 3 are for explanation and not for limitation. Business objects, interim business objects, and the like useful in embodiments of the present invention may include many different fields and different structure as will occur to those of skill in the art.

Figure 4:
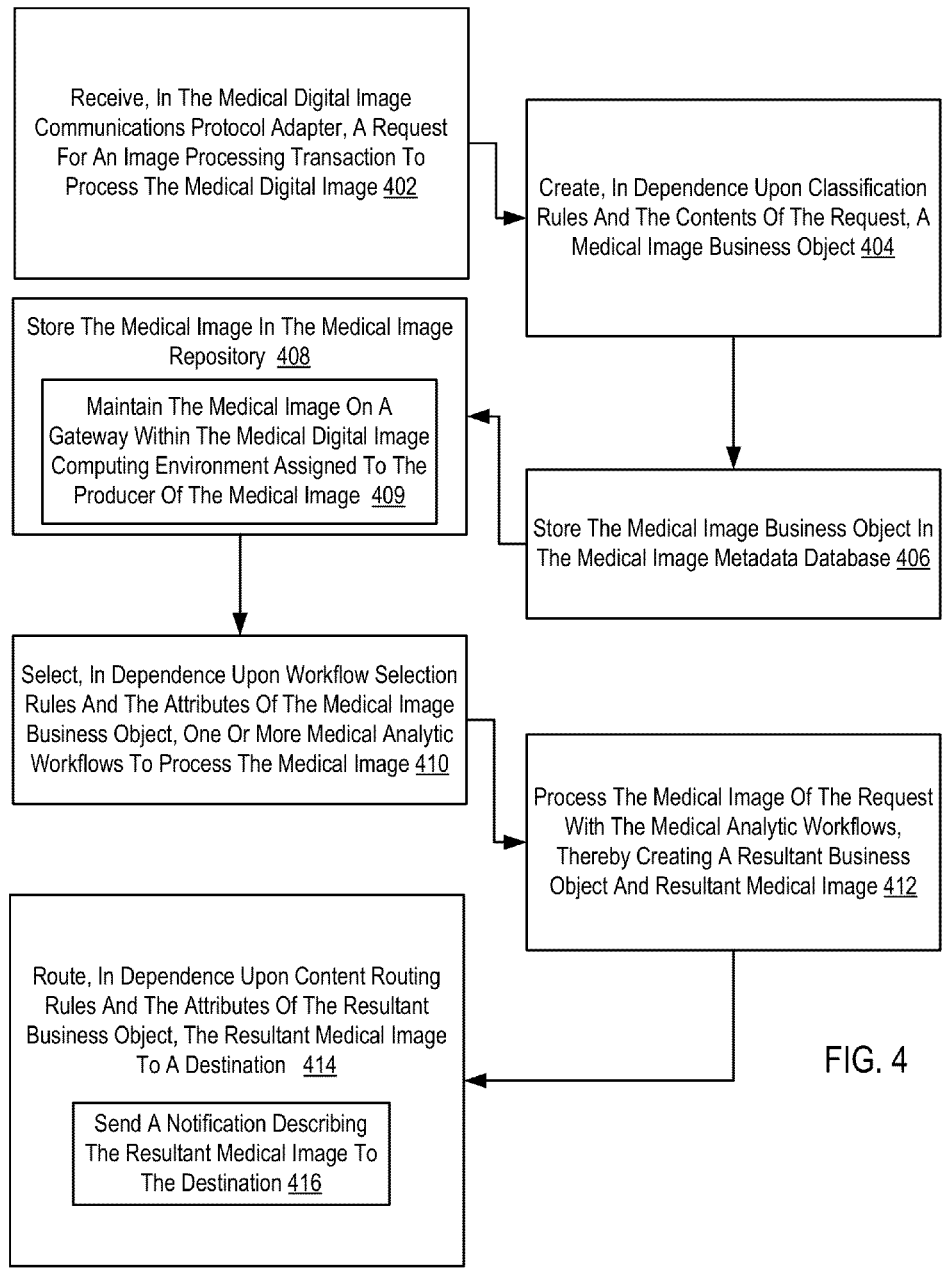
FIG. 4 sets forth a flow chart illustrating an example method of administering medical digital images in a distributed medical digital image computing environment according to embodiments of the present invention.

For further explanation, FIG. 4 sets forth a flow chart illustrating an example method of administering medical digital images in a distributed medical digital image computing environment according to embodiments of the present invention. In some embodiments, the distributed medical digital image computing environment is implemented as a cloud computing environment. The medical digital image computing environment may include a medical digital image communications protocol adapter, a medical image metadata database, a medical image repository, and a medical image transaction workflow dispatcher.

The method of FIG. 4 includes receiving (402), in the medical digital image communications protocol adapter, a request for an image processing transaction to process one or more of the medical digital images. In the example of FIG. 4, the request may include a medical image to be processed and metadata describing the medical image. The metadata describing the medical image may include, for example, an identification of the image type, a specification of the image resolution, a specification of the image size, and so on. In the example of FIG. 4, the request may also include an identification of the processing to be performed on the image. The identification of the processing to be performed on the image may include, for example, an identification of a workflow that is to process the image. In the example of FIG. 4, the request may be transmitted according to one of a plurality of a medical image communications protocol supported by medical digital image communications protocol adapter and used by a producer of the medical images.

The method of FIG. 4 includes creating (404) a medical image business object. In the example of FIG. 4, the medical image business object may represent an image processing operation that is to be performed. The medical image business object may include, for example, an identification of one or more workflows that will carry out the image processing operation that is to be performed, an identification of a destination that is to receive the output generated by performing the image processing operation, a description of the data types for inputs and outputs for the one or more workflows that will carry out the image processing operation, and so on.

In the example method of FIG. 4, creating (404) a medical image business object may be carried out in dependence upon classification rules and the contents of the request. Classification rules are rules that may be tailored to parsing and identifying the type of request according to the protocol and standard in which in which the request was created. The classification rules may also be tailored to develop the medical image business object by including the extracted images and metadata in a predefined structure in the medical image business object. Classification rules allow for disparate metadata, arriving in disparate protocols and standards to be read, understood classified and organized according to a defined structure for the medical image business object. Creating (404) the medical image business object may be carried out by extracting from the request metadata describing the image according to the medical image communications protocol of the request and conforming the metadata to the predefined structure of the medical image business object.

The method of FIG. 4 also includes storing (406) the medical image business object in the medical image metadata database. In the example method of FIG. 4, storing (406) the medical image business object in the medical image metadata database may include storing the medical image business object locally on a medical imaging gateway. Alternatively, storing (406) the medical image business object in the medical image metadata database may include providing the business object for storage elsewhere in the distributed processing system.

The method of FIG. 4 also includes storing (408) the medical image in the medical image repository. In the example of FIG. 4, storing (408) the medical image in the medical image repository may include maintaining (409) the medical image on a gateway within the medical digital image computing environment. Such a gateway may be assigned to the producer of the medical image, such that all medical images produced by a particular producer of medical images are stored in a single, identifiable gateway. Particular gateways may be assigned to particular producers, for example, based on the type of images produced by the producer, based on the size of images produced by the producer, and in other ways as will occur to those of skill in the art.

The method of FIG. 4 also includes selecting (410), in dependence upon workflow selection rules and the attributes of the medical image business object, one or more medical analytic workflows to process the medical image. Workflow selection rules are rules that are tailored to carrying out the image processing transaction on the medical images and the medical image business object according to the request received by the health care provider. Such workflow selection rules identify the necessary requirements of the transaction and select workflows having services that carry out those requirements as well as select workflows that are tailored for the attributes of those images such as the slice size, number of slices, type of scanner used to create the images, standards used for the images and many others as will occur to those of skill in the art. Workflows may include analytics for tumor detection, tumor growth, aneurysm detection, vessel separation in a patients head, and many other medical conditions, workflows for image compression, image resolution, distribution of images, and many other workflows for medical image processing that will occur to those of skill in the art.

The method of FIG. 4 also includes processing (412) the medical image of the request with the medical analytic workflows, thereby creating a resultant business object and resultant medical image. Processing (412) the medical image of the request with the medical analytic workflows may be carried out, for example, by executing the selected workflows using the medical images and the medical image business model associated with the requested image processing transaction as inputs to the selected workflows.

The method of FIG. 4 also includes routing (414), in dependence upon content routing rules and the attributes of the resultant business object, the resultant medical image to one or more destinations. Content routing rules are rules dictating the manner in which resultant medical images are routed to the destination. Such rules are often based on the content of the resultant medical image such that the image is routed to an appropriate health care provider in a manner that conforms to both security and privacy. Often the destination of the image is a different location, logical or physical, from the provider of the original medical image prior to its being processed by the medical digital image transaction cluster. Content routing rules may also dictate the manner in which the health care provider may access the resultant medical images and who may access such images.

Routing (414) the resultant medical image according to the method of FIG. 4 may include extracting metadata from the resultant business object, creating a response to the request the response conforming to a particular digital image communications protocol used for the destination, and transmitting the response according to the particular digital image communications protocol. Routing (414) the resultant medical image to one or more destinations may also include storing the resultant medical image on a gateway within the medical digital image computing environment assigned to the producer of the medical image and transmitting the response according to the particular digital image communications protocol further comprises transmitting in the response data access information to access the resultant medical image on the gateway.

Routing (414), in dependence upon content routing rules and the attributes of the resultant business object, the resultant medical image to one or more destinations according to the method of FIG. 4 also includes sending (414) a notification describing the resultant medical image to the one or more destinations. Examples of a such a notification may be an email message or a text message to a health care provider notifying the health care provider that the response to the request is ready for viewing or that the workflows processing the medical images identified aspects of the images that are consistent with a medical condition such as tumor, aneurism, vessel separation, and so on as will occur to those of skill in the art.

Figure 5:
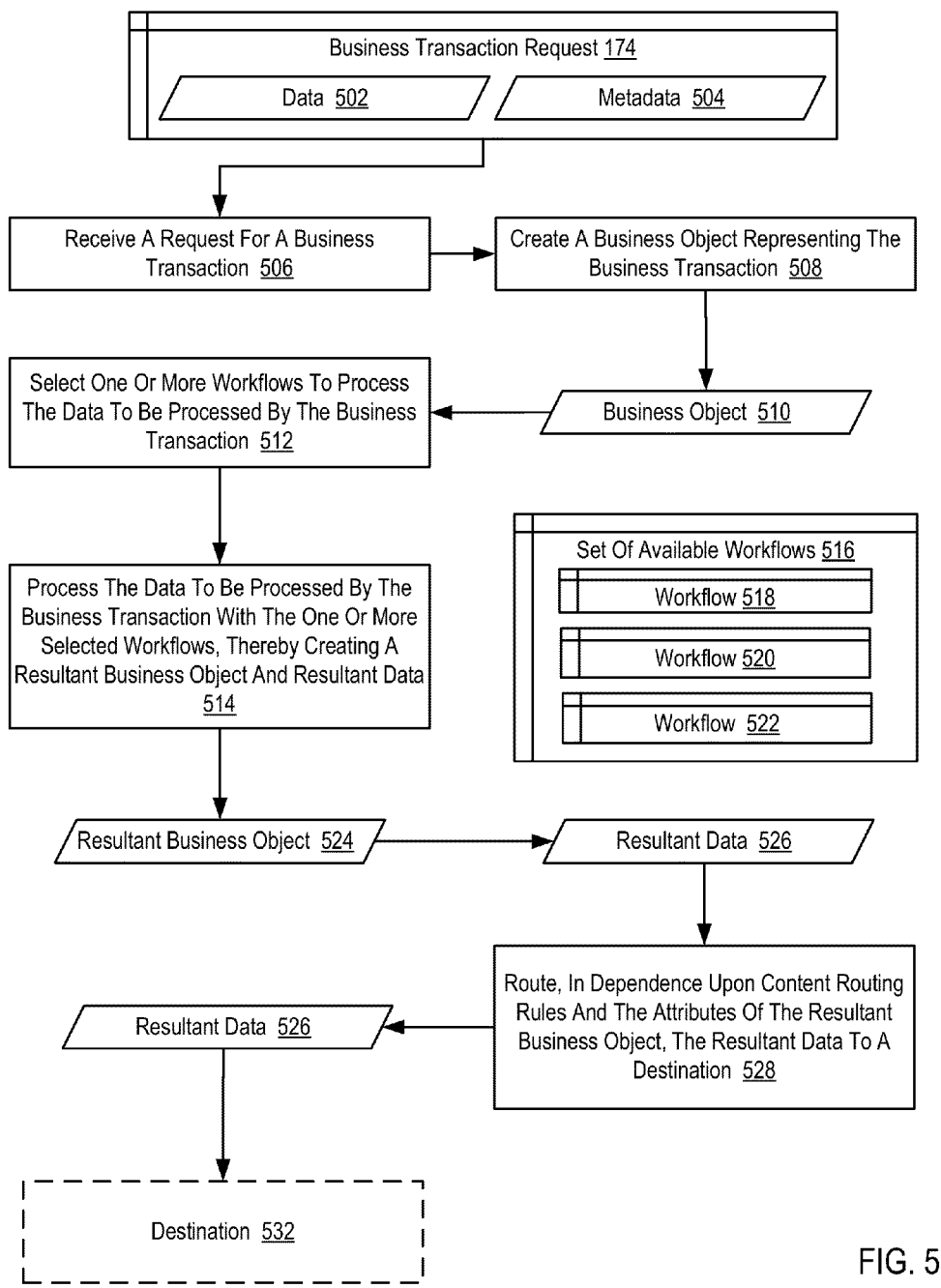
FIG. 5 sets forth a flow chart illustrating an example method of administering a business transaction according to embodiments of the present invention.

For further explanation, FIG. 5 sets forth a flow chart illustrating an example method of administering a business transaction according to embodiments of the present invention. The example method of FIG. 5 includes receiving (506) a request (174) for a business transaction. In the example of FIG. 5, the request (174) for a business transaction may be embodied as a data structure that includes information that represents a request for a particular task to be executed. For example, the request (174) for a business transaction may include a request to analyze medical imaging data, a request to generate and transmit billing information over a medical cloud computing environment, a request to transmit other medical data over a medical cloud computing environment, a request to monitor the status of medical equipment, and so on.

In the example of FIG. 5, the request (174) for a business transaction includes data (502) to be processed by the business transaction and metadata (504) describing the data (502) and the request (174). Consider an example in which the request (174) for a business transaction is a request to analyze medical imaging data. In such an example, the data (502) to be processed by the business transaction may include one or more medical images. The metadata (504) describing the data (502) and the request (174) may include, for example, a description of the medical imaging data, an identification of the data format of the medical imaging data, an identification of the device that created the medical imaging data, an identification of any encryption that has been applied to the medical imaging data, and so on.

The example of FIG. 5 also includes creating (508) a business object (510) representing the business transaction. In the example of FIG. 5, the business object (510) may be embodied as a data structure that contains information related to a business transaction that is to be carried out. The business object (510) may include, for example, a description of the business transaction that is to be carried out, pointers to input data that will be processed by the business transaction, information identifying computing resources that will carry out the business transaction, and so on.

In the example of FIG. 5, the business object (510) is created (508) in dependence upon classification rules that are used to characterize the business transaction, as well as the data (502) to be processed by the business transaction and the metadata (504) describing the data (502) and the request (174). Creating (508) the business object (510) in dependence upon the data (502) to be processed by the business transaction and the metadata (504) describing the data (502) and the request (174) may be carried out, for example, by inspecting the data (502) to be processed by the business transaction and also inspecting the metadata (504) describing the data (502) and the request (174) to extract information for inclusion in the business object (510).

The example of FIG. 5 also includes selecting (512), in dependence upon workflow selection rules and attributes of the business object (510), one or more workflows (518, 520, 522) to process the data (502) to be processed by the business transaction. The example of FIG. 5 includes a set (516) of available workflows that includes three workflows (518, 520, 522). In the example of FIG. 5, each workflow (518, 520, 522) is a module of computer program instructions that, when executed, carry out some function. By using one or more workflows (518, 520, 522), a business transaction may be carried out. For example, a first workflow may packetize a medical image while a second workflow transfers packetized data over a medical cloud computing environment, such that the combination of workflows can be used to transfer medical imaging data over a medical cloud computing environment.

In the example of FIG. 5, selecting (512) one or more workflows (518, 520, 522) to process the data (502) to be processed by the business transaction may be carried out, for example, through the use of workflow selection rules. The workflow selection rules may include, for example, rules that associate particular types of input data with particular workflows, rules that associate particular types of output data with particular workflows, rules that associate particular senders and receivers of data with particular workflows, and so on. In the example of FIG. 5, attributes of the business object (510) may be extracted from the business object (510) and analyzed using the workflow selection rules to select (512) one or more workflows (518, 520, 522) to process the data (502) to be processed by the business transaction.

The example of FIG. 5 also includes processing (514) the data (502) to be processed by the business transaction with the one or more selected workflows (518, 520, 522). In the example of FIG. 5, processing (514) the data (502) to be processed by the business transaction with the one or more selected workflows (518, 520, 522) may be carried out by passing the data (502) to the one or more selected workflows (518, 520, 522) as input parameters and executing the one or more selected workflows (518, 520, 522).

In the example of FIG. 5, processing (514) the data (502) to be processed by the business transaction with the one or more selected workflows (518, 520, 522) can create a resultant business object (524) and resultant data (526). In the example of FIG. 5, the resultant data (526) may represent the output generated by executing the one or more selected workflows (518, 520, 522). The output generated by executing the one or more selected workflows (518, 520, 522), as well as any other information related to carrying out the business function, may be included in a resultant business object (524). The resultant business object (524) of FIG. 5 can be a data structure for storing information related to the execution of a particular business function.

The example of FIG. 5 also includes routing (528) the resultant data (526) to a destination (532). In the example of FIG. 5, the destination (532) may be embodied as a location in computer memory in a cloud computing environment, a device that can communication through the cloud computing environment, and so on. In the example of FIG. 5, the resultant data (526) may be routed (528) to the destination (532) in dependence upon content routing rules and the attributes of the resultant business object (524). Content routing rules may include, for example, rules indicating that resultant data of a particular type be routed to a particular destination, rules indicating that resultant data generated by a particular workflow be routed to a particular destination, and so on. In the example of FIG. 5, attributes of the resultant business object (524) may be extracted from the resultant business object (524) and analyzed using the content routing rules to select a destination (532) that is to receive the resultant data (526).

Figure 6:
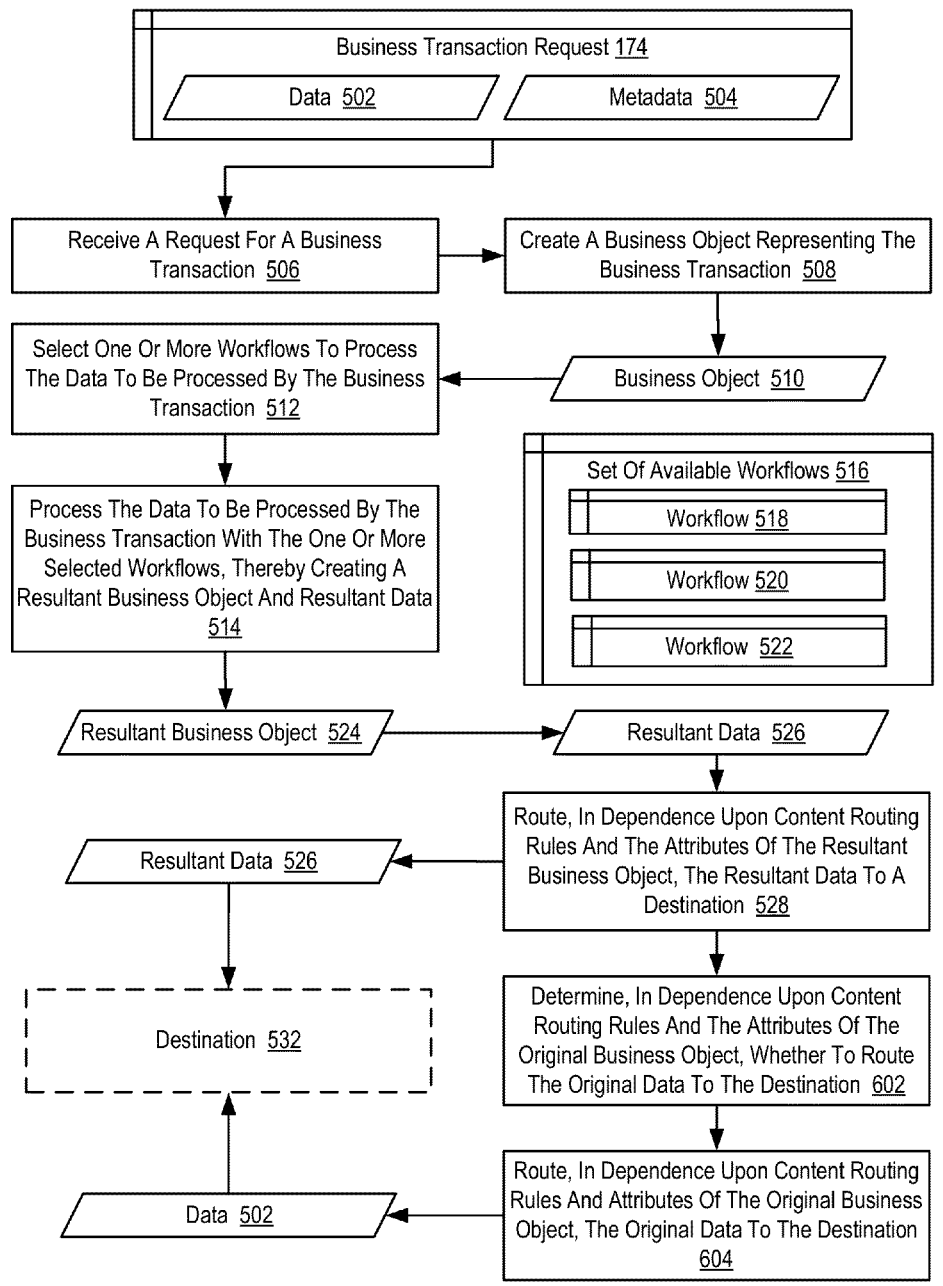
FIG. 6 sets forth a flow chart illustrating an example method of administering a business transaction according to embodiments of the present invention.

For further explanation, FIG. 6 sets forth a flow chart illustrating an example method of administering a business transaction according to embodiments of the present invention. The example method of FIG. 6 is similar to the example method of FIG. 5 as it also includes: receiving (506) a request (174) for a business transaction; creating (508) a business object (510); selecting (512) workflows (518, 520, 522); processing (514) the data (502); and routing (528) the resultant data (526) to a destination (532).

The example method of FIG. 6 also includes determining (602), in dependence upon content routing rules and the attributes of the original business object (510), whether to route the original data (502) to the destination (532). In the example method of FIG. 6, the destination (532) may use the original data (502) to verify that the resultant data (526) is correct. The destination (532) may also use the original data (502) to compare against the resultant data (526) for the purpose of identify differences between the original data (502) and the resultant data (526). Attributes within the original business object (510) may be marked such that upon processing of the original data (502), the original data (502) will be sent to the destination (532) that is to receive the resultant data (526) generated by executing the one or more workflows (518, 520, 522).

In the example of FIG. 6, if the original data (502) is to be routed to the destination (532), the original data (502) may be routed (604) to the destination (532) by transmitting the original data (502) to the destination (532) using the medical cloud computing environment. In the example of FIG. 6, the original data (502) may be routed (604) to the destination (532) in dependence upon content routing rules and attributes of the original business object (510). For example, if the original business object (510) identifies a transmission protocol that is to be used for transmitting the original data (502), the content routing rules may be utilized to determine an appropriate data communications connection that can be used to transmit the original data (502) to the destination (532).

Figure 7:
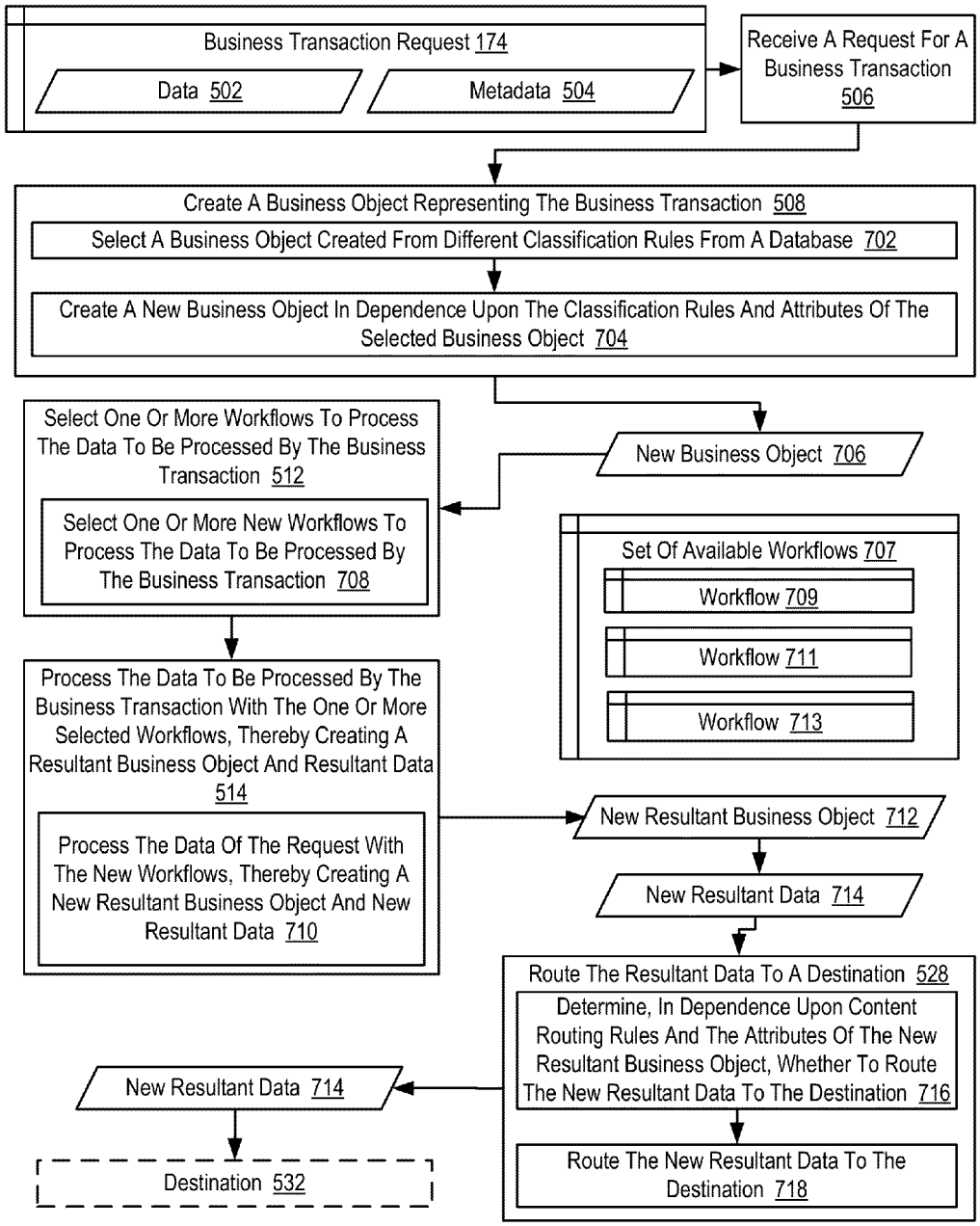
FIG. 7 sets forth a flow chart illustrating an example method of administering a business transaction according to embodiments of the present invention.

For further explanation, FIG. 7 sets forth a flow chart illustrating an example method of administering a business transaction according to embodiments of the present invention. The example method of FIG. 7 is similar to the example method of FIG. 5 as it also includes: receiving (506) a request (174) for a business transaction; creating (508) a business object (510); selecting (512) workflows (518, 520, 522); processing (514) the data (502); and routing (528) the resultant data (526) to a destination (532).

In the example method of FIG. 7, creating (508) a business object representing the business transaction includes selecting (702) a business object created from different classification rules from a database. In the example of FIG. 7, a collection of business objects may be created and stored in a database, providing an inventory of predefined business objects that are available for use. These business objects may be useful to carry out common and frequently repeated business transactions.

In the example method of FIG. 7, creating (508) a business object (510) representing the business transaction also includes creating (704) a new business object (706) in dependence upon the classification rules and attributes of the selected business object. In the example method of FIG. 7, the new business object (706) may be embodied as a data structure that contains information related to a business transaction that is to be carried out. The new business object (706) may include, for example, a description of the business transaction that is to be carried out, pointers to input data that will be processed by the business transaction, information identifying computing resources that will carry out the business transaction, and so on.

The example method of FIG. 7 also includes selecting (708), in dependence upon workflow selection rules and attributes of the new business object (706), one or more new workflows (709, 711, 713) to process the data to be processed by the business transaction. The example method of FIG. 7 includes a set (707) of available workflows that includes three workflows (709, 711, 713). In the example of FIG. 7, each workflow (709, 711, 713) is a module of computer program instructions that, when executed, carry out some function. By using one or more new workflows (709, 711, 713), a business transaction may be carried out. For example, a first workflow may packetize and compress a medical image while a second workflow transfers compressed packetized data over a medical cloud computing environment, such that the combination of workflows can be used to transfer medical imaging data over a medical cloud computing environment.

The example method of FIG. 7 also includes processing (514) the data of the request with the new workflows (709, 711, 713), thereby creating a new resultant business object (712) and new resultant data (714). In the example method of FIG. 7, the new resultant data (714) may represent the output generated by executing the one or more new selected workflows (709, 711, 713). The output generated by executing the one or more new selected workflows (709, 711, 713), as well as any other information related to carrying out the business function, may be included in a resultant business object (712). The resultant business object (712) of FIG. 7 can be a data structure for storing information related to the execution of a particular business function.

The example method of FIG. 7 also includes determining (716), in dependence upon content routing rules and the attributes of the new resultant business object (712), whether to route the new resultant data (714) to the destination (532). In the example method of FIG. 7, the destination (532) may be embodied as a location in computer memory in a cloud computing environment, a device that can communication through the cloud computing environment, and so on. Content routing rules may include, for example, rules indicating that resultant data of a particular type be routed to a particular destination, rules indicating that resultant data generated by a particular workflow be routed to a particular destination, and so on. In the example of FIG. 7, attributes of the new resultant business object (712) may be extracted from the new resultant business object (712) and analyzed using the content routing rules to select a destination (532) that is to receive the new resultant data (714).

In the example method of FIG. 7, if the new resultant data (714) is to be routed to the destination (532), the new resultant data (714) is routed to the destination (532) in dependence upon content routing rules and the attributes of the new resultant business object (712). In the example method of FIG. 7, the new resultant data (714) may be routed (718) to the destination (532), for example, over data communications specified in the content routing rules.

As mentioned above, a cloud computing environment useful in embodiments of the present invention is generally considered service oriented with a focus on statelessness, low coupling, modularity, and semantic interoperability. At the heart of cloud computing is an infrastructure comprising a network of interconnected nodes. For further explanation, FIG. 8 sets forth a block diagram of an example of a cloud computing node useful according to embodiments of the present invention. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

The cloud computing node (10) is operational with numerous other general purpose or special purpose computing system environments or configurations. Examples of well-known computing systems, environments, and/or configurations that may be suitable for use with the cloud computing node (10) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The cloud computing node (10) may be described in the general context of computer system-executable instructions, such as program modules, being executed by a computer system. Generally, program modules may include routines, programs, objects, components, logic, data structures, and so on that perform particular tasks or implement particular abstract data types. The cloud computing node (10) may be practiced in distributed cloud computing environments where tasks are performed by remote processing devices that are linked through a communications network. In a distributed cloud computing environment, program modules may be located in both local and remote computer system storage media including memory storage devices.

Figure 8:
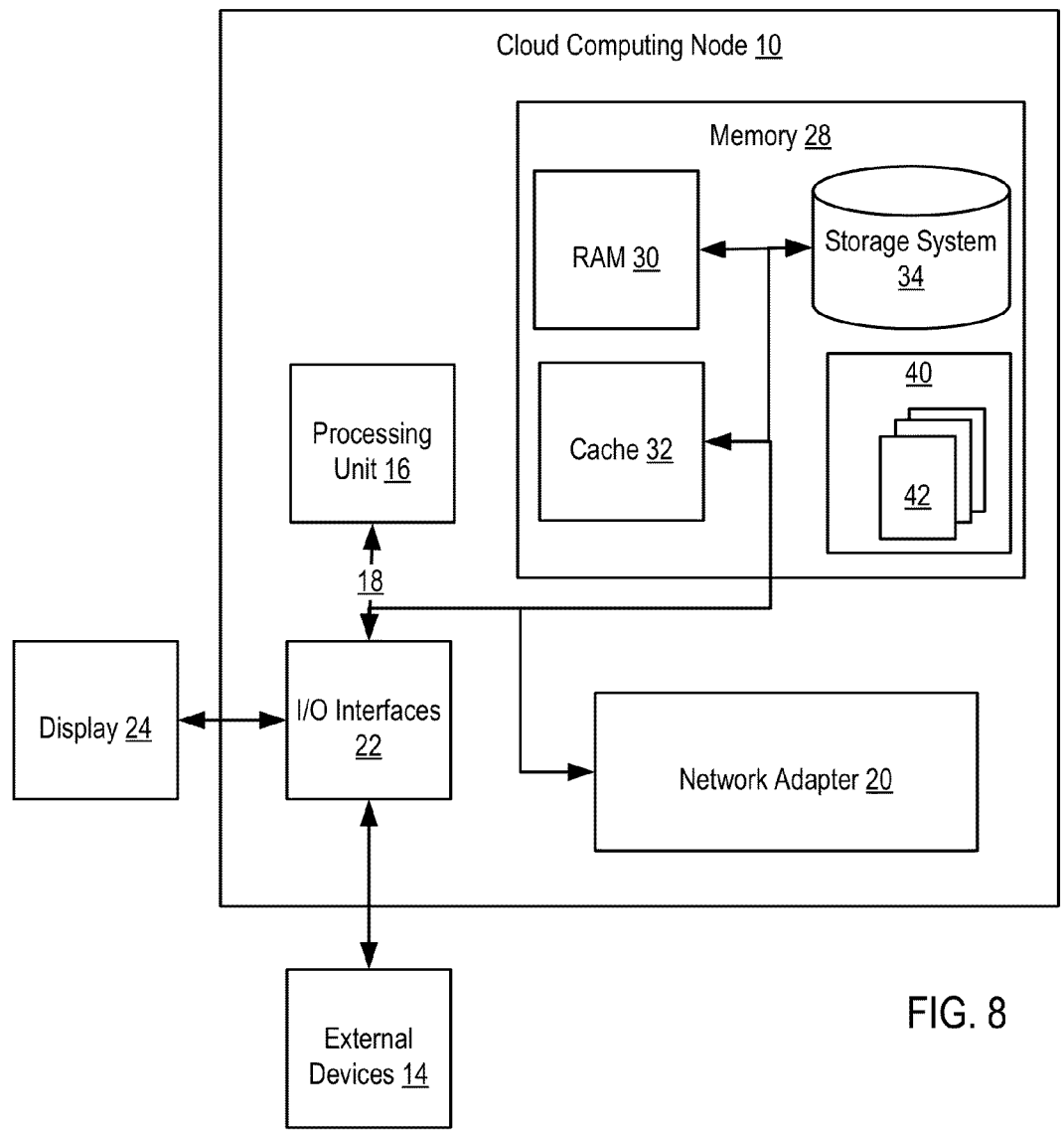
FIG. 8 sets forth a block diagram of an example of a cloud computing node useful according to embodiments of the present invention.

As shown in FIG. 8, the cloud computing node (10) is shown in the form of a general-purpose computing device. The components of the cloud computing node (10) may include, but are not limited to, one or more processors or processing units (16), a system memory (28), and a bus (18) that couples various system components including the system memory (28) to the processor (16).

The bus (18) in the example of FIG. 8 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnects ('PCI') bus.

The cloud computing node (10) of FIG. 8 often includes a variety of computer system readable media. Such media may be any available media that is accessible by the cloud computing node (10), and it includes both volatile and non-volatile media, removable and non-removable media.

The system memory (28) in the example of FIG. 8 can include computer system readable media in the form of volatile memory, such as random access memory ('RAM') (30) and/or cache memory (32). The cloud computing node (10) may further include other removable/non-removable, volatile/non-volatile computer system storage media. By way of example only, a storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, the memory (28) may include at least one program product having a set (e.g., at least one) of program modules that are configured to carry out the functions of embodiments of the invention.

The example of FIG. 8 includes a program/utility (40) having a set (at least one) of program modules (42) that may be stored in the memory (28). The cloud computing node (10) of FIG. 8 may also include an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

The cloud computing node (10) of FIG. 8 may also communicate with one or more external devices (14) such as a keyboard, a pointing device, a display (24), and so on that enable a user to interact with the cloud computing node (10). The cloud computing node (10) may also include any devices (e.g., network card, modem, etc.) that enable the cloud computing node (10) to communicate with one or more other computing devices. Such communication can occur, for example, via I/O interfaces (22). Still yet, the cloud computing node (10) can communicate with one or more networks such as a local area network ('LAN'), a general wide area network ('WAN'), and/or a public network (e.g., the Internet) via network adapter (20). As depicted, network adapter (20) communicates with the other components of the cloud computing node (10) via the bus (18). It should be understood that although not shown, other hardware and/or software components could be used in conjunction with the cloud computing node (10). Examples include, but are not limited to, microcode, device drivers, redundant processing units, external disk drive arrays, RAID systems, tape drives, and data archival storage systems, and so on.

Figure 9:
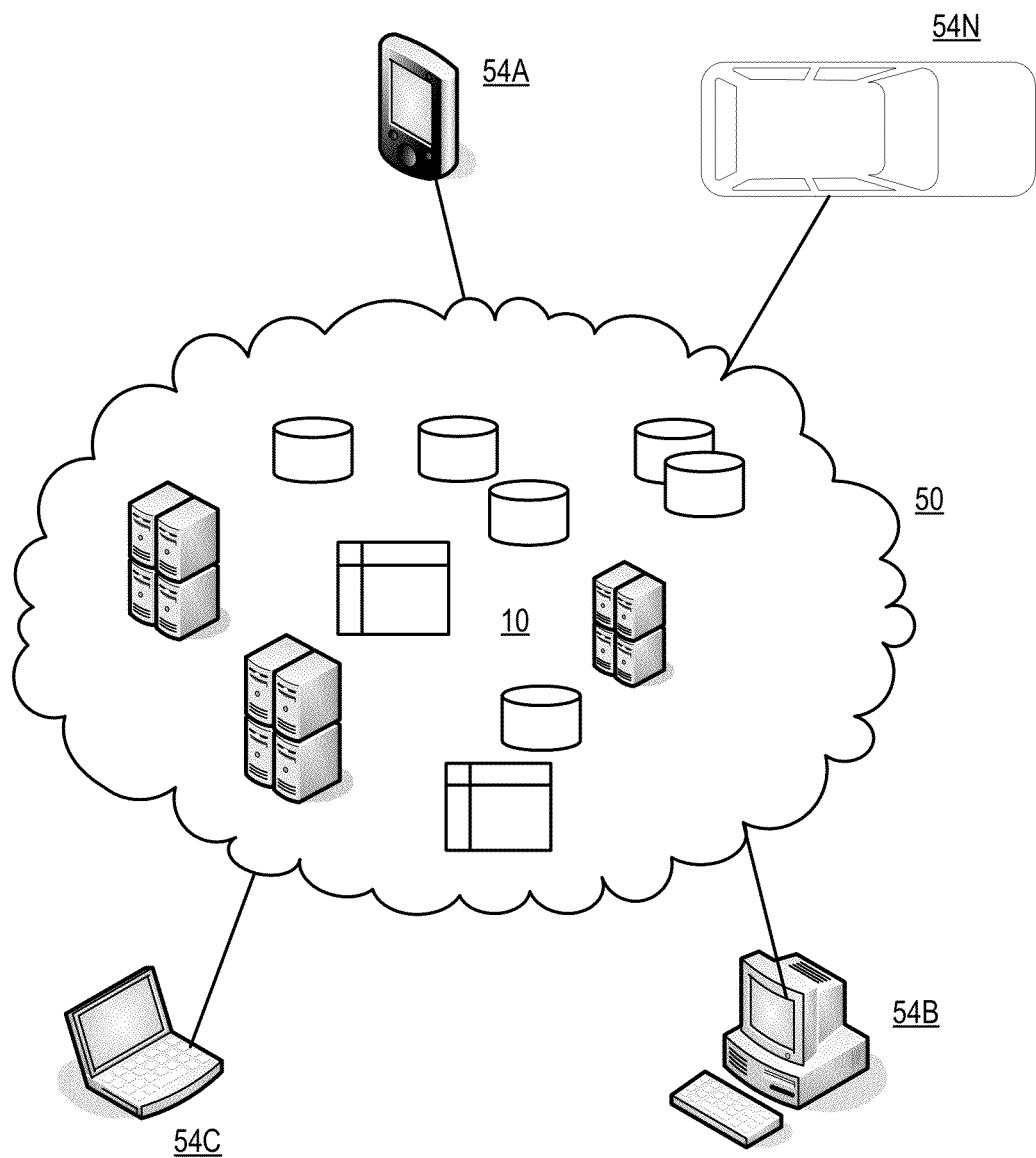
FIG. 9 sets forth a line drawing of an example cloud computing environment.

For further explanation, FIG. 9 sets forth a line drawing of an example cloud computing environment (50). The cloud computing environment (50) of FIG. 9 comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as private, community, public, or hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 9 are intended to be illustrative only and that computing nodes (10) and cloud computing environment (50) can communicate with any type of computerized device over any type of network and/or network addressable connection (e.g., using a web browser).

Figure 10:
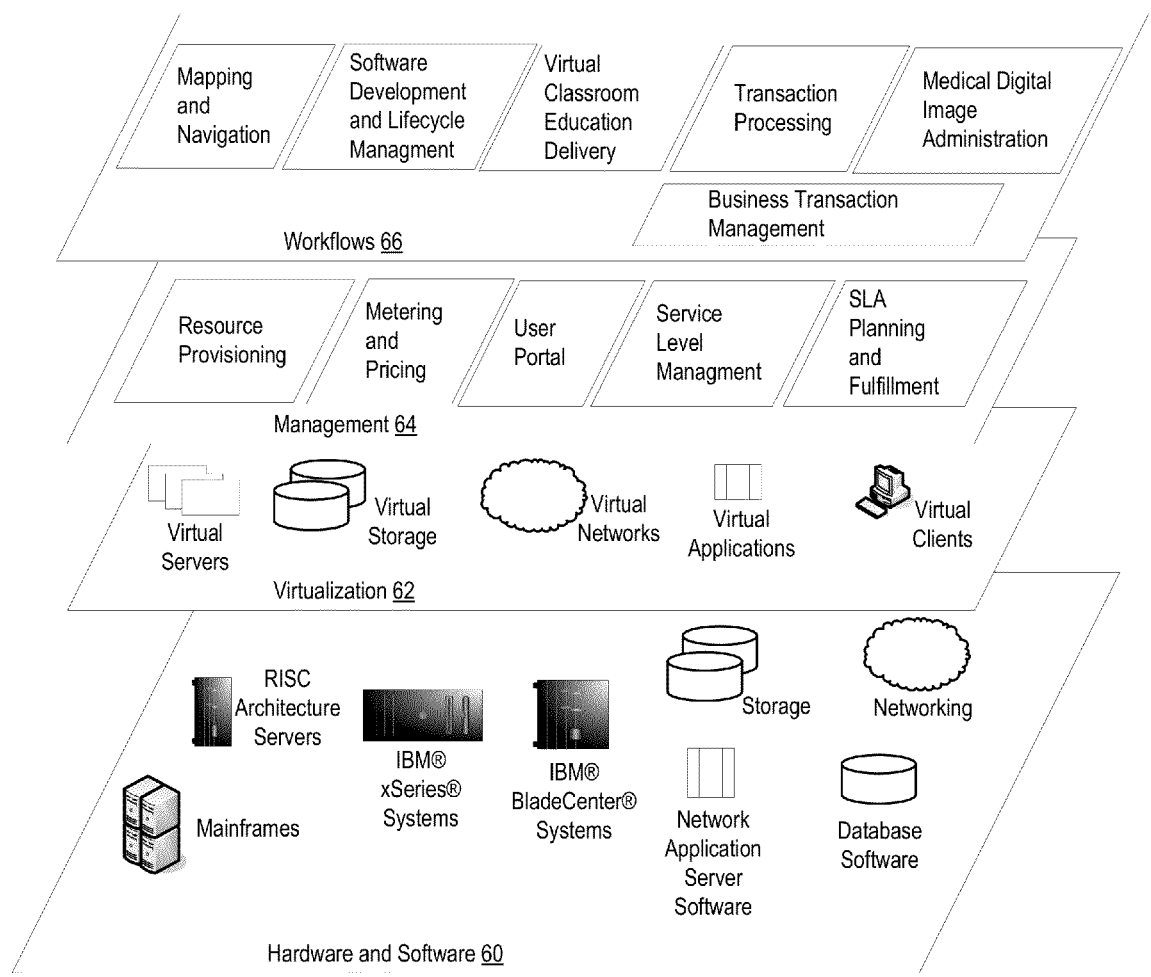
FIG. 10 sets forth a line drawing showing an example set of functional abstraction layers provided by cloud computing environment.

For further explanation, FIG. 10 sets forth a line drawing showing an example set of functional abstraction layers provided by cloud computing environment (50 in FIG. 9). It should be understood in advance that the components, layers, and functions shown in FIG. 10 are intended to be illustrative only and embodiments of the invention are not limited thereto. As depicted, the following layers and corresponding functions are provided:

The example of FIG. 10 includes a hardware and software layer (60). Hardware and software layer (60) in the example of FIG. 10 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The example of FIG. 10 includes a virtualization layer (62). The virtualization layer (62) of FIG. 10 provides an abstraction layer from which the following examples of virtual entities may be provided: virtual servers; virtual storage; virtual networks, including virtual private networks; virtual applications and operating systems; and virtual clients.

The example of FIG. 10 also includes a management layer (64). The management layer (64) may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The example of FIG. 10 also includes a workflows layer (66). The workflows layer (66) of FIG. 10 provides examples of functionality for which the cloud computing environment may be utilized. Examples of workflows and functions which may be provided from this layer include: mapping and navigation; software development and lifecycle management; virtual classroom education delivery; data analytics processing; and transaction processing.

The workflows layer (66) can administer a business transaction, including: receiving a request for a business transaction, the request containing data to be processed by the business transaction and metadata describing the data and the request; creating, in dependence upon classification rules, the data to be processed by the business transaction, and the metadata describing the data and the request, a business object representing the business transaction; selecting, in dependence upon workflow selection rules and attributes of the business object, one or more workflows to process the data to be processed by the business transaction; processing the data to be processed by the business transaction with the one or more selected workflows, thereby creating a resultant business object and resultant data; and routing, in dependence upon content routing rules and the attributes of the resultant business object, the resultant data to a destination.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of administering digital medical image processing transactions, the method comprising:

receiving, by a module of automated computing machinery, a request for a medical image processing transaction, the request containing data to be processed by the medical image processing transaction and metadata describing the data and the request, wherein the data to be processed is medical digital image data;

creating, by the module of automated computing machinery in dependence upon classification rules characterizing the data to be processed by the medical image processing transaction and the metadata describing the data and the request, a medical image processing object representing the medical image processing transaction, wherein the medical image processing object comprises the data to be processed and the metadata describing the data and the request, and wherein the classification rules parse the request according to standards in which the request was created;

analyzing, by the module of automated computing machinery, data processing component selection rules and attributes of the medical image processing object to select one or more data processing components to process the data to be processed by the medical image processing transaction, wherein the data processing component selection rules carry out the medical image processing transaction according to the request, and wherein the one or more data processing components that are selected are tailored for attributes of the medical image processing object, and the one or more data processing components are medical image processing data processing components;

processing, by the module of automated computing machinery, the data to be processed by the medical image processing transaction with the one or more selected data processing components, thereby creating a resultant medical image processing object and resultant data; and routing, by the module of automated computing machinery in dependence upon content routing rules and the attributes of the resultant medical image processing object, the resultant data to a destination.

2. The method of claim 1 further comprising:

determining, in dependence upon content routing rules and the attributes of the original medical image processing object, whether to route the original data to the destination; and if the original data is to be routed to the destination, routing, in dependence upon content routing rules and attributes of the original medical image processing object, the original data to the destination.

3. The method of claim 1 wherein creating, in dependence upon classification rules, the data to be processed by the medical image processing transaction, and the metadata describing the data and the request, a medical image processing object representing the medical image processing transaction further comprises:

selecting a medical image processing object created from different classification rules from a database; and creating a new medical image processing object in dependence upon the classification rules and attributes of the selected medical image processing object.

4. The method of claim 3 further comprising selecting, in dependence upon data processing component selection rules and attributes of the new medical image processing object, one or more new data processing components to process the data to be processed by the medical image processing transaction.

5. The method of claim 4 further comprising processing the data of the request with the new data processing components, thereby creating a new resultant medical image processing object and new resultant data.

6. The method of claim 5 further comprising determining, in dependence upon content routing rules and the attributes of the new resultant medical image processing object, whether to route the new resultant data to the destination; and if the new resultant data is to be routed to the destination, routing, in dependence upon content routing rules and the attributes of the new resultant medical image processing object, the new resultant data to the destination.

7. A system for administering digital medical image processing transactions, the system comprising one or more computer processors and computer memory operatively coupled to the computer processors, the computer memory having disposed within it computer program instructions that, when executed by the one or more computer processors, cause the one or more computer processors to carry out the steps of:

receiving, by a module of automated computing machinery, a request for a medical image processing transaction, the request containing data to be processed by the medical image processing transaction and metadata describing the data and the request, wherein the data to be processed is medical digital image data;

creating, in dependence upon classification rules characterizing the data to be processed by the medical image processing transaction and the metadata describing the data and the request, a medical image processing object representing the medical image processing transaction, wherein the medical image processing object comprises the data to be processed and the metadata describing the data and the request, and wherein the classification rules parse the request according to standards in which the request was created;

analyzing, by the module of automated computing machinery, data processing component selection rules and attributes of the medical image processing object to select one or more data processing components to process the data to be processed by the medical image processing transaction, wherein the data processing component selection rules carry out the medical image processing transaction according to the request, and wherein the one or more data processing components that are selected are tailored for attributes of the medical image processing object, and the one or more data processing components are medical image processing data processing components;

processing the data to be processed by the medical image processing transaction with the one or more selected data processing components, thereby creating a resultant medical image processing object and resultant data; and routing, in dependence upon content routing rules and the attributes of the resultant medical image processing object, the resultant data to a destination.

8. The system of claim 7 further comprising computer program instructions that, when executed by the one or more computer processors, cause the one or more computer processors to carry out the steps of:

determining, in dependence upon content routing rules and the attributes of the original medical image processing object, whether to route the original data to the destination; and if the original data is to be routed to the destination, routing, in dependence upon content routing rules and attributes of the original medical image processing object, the original data to the destination.

9. The system of claim 7 wherein creating, in dependence upon classification rules, the data to be processed by the medical image processing transaction, and the metadata describing the data and the request, a medical image processing object representing the medical image processing transaction further comprises:

selecting a medical image processing object created from different classification rules from a database; and creating a new medical image processing object in dependence upon the classification rules and attributes of the selected medical image processing object.

10. The system of claim 9 further comprising computer program instructions that, when executed by the one or more computer processors, cause the one or more computer processors to carry out the step of selecting, in dependence upon data processing component selection rules and attributes of the new medical image processing object, one or more new data processing components to process the data to be processed by the medical image processing transaction.

11. The system of claim 10 further comprising computer program instructions that, when executed by the one or more computer processors, cause the one or more computer processors to carry out the step of processing the data of the request with the new data processing components, thereby creating a new resultant medical image processing object and new resultant data.

12. The system of claim 11 further comprising computer program instructions that, when executed by the one or more computer processors, cause the one or more computer processors to carry out the steps of:

determining, in dependence upon content routing rules and the attributes of the new resultant medical image processing object, whether to route the new resultant data to the destination; and if the new resultant data is to be routed to the destination, routing, in dependence upon content routing rules and the attributes of the new resultant medical image processing object, the new resultant data to the destination.

13. A computer program product for administering digital medical image processing transactions, the computer program product disposed upon a computer readable medium, the computer program product comprising computer program instructions that, when executed, cause a computer to carry out the steps of:

receiving, by a module of automated computing machinery, a request for a medical image processing transaction, the request containing data to be processed by the medical image processing transaction and metadata describing the data and the request, wherein the data to be processed is medical digital image data;

creating, in dependence upon classification rules characterizing the data to be processed by the medical image processing transaction and the metadata describing the data and the request, a medical image processing object representing the medical image processing transaction, wherein the medical image processing object comprises the data to be processed and the metadata describing the data and the request, and wherein the classification rules parse the request according to standards in which the request was created;

analyzing, by the module of automated computing machinery, data processing component selection rules and attributes of the medical image processing object to select one or more data processing components to process the data to be processed by the medical image processing transaction, wherein the data processing component selection rules carry out the medical image processing transaction according to the request, and wherein the one or more data processing components that are selected are tailored for attributes of the medical image processing object, and the one or more data processing components are medical image processing data processing components;

processing the data to be processed by the medical image processing transaction with the one or more selected data processing components, thereby creating a resultant medical image processing object and resultant data; and routing, in dependence upon content routing rules and the attributes of the resultant medical image processing object, the resultant data to a destination.

14. The computer program product of claim 13 further comprising computer program instructions that, when executed, cause a computer to carry out the steps of:
- determining, in dependence upon content routing rules and the attributes of the original medical image processing object, whether to route the original data to the destination; and
- if the original data is to be routed to the destination, routing, in dependence upon content routing rules and attributes of the original medical image processing object, the original data to the destination.

15. The computer program product of claim 13 wherein creating, in dependence upon classification rules, the data to be processed by the medical image processing transaction, and the metadata describing the data and the request, a medical image processing object representing the medical image processing transaction further comprises:
- selecting a medical image processing object created from different classification rules from a database; and
- creating a new medical image processing object in dependence upon the classification rules and attributes of the selected medical image processing object.

16. The computer program product of claim 15 further comprising computer program instructions that, when executed, cause a computer to carry out the step of selecting, in dependence upon data processing component selection rules and attributes of the new medical image processing object, one or more new data processing components to process the data to be processed by the medical image processing transaction.

17. The computer program product of claim 16 further comprising computer program instructions that, when executed, cause a computer to carry out the step of processing the data of the request with the new data processing components, thereby creating a new resultant medical image processing object and new resultant data.

18. The computer program product of claim 16 further comprising computer program instructions that, when executed, cause a computer to carry out the steps of:
- determining, in dependence upon content routing rules and the attributes of the new resultant medical image processing object, whether to route the new resultant data to the destination; and
- if the new resultant data is to be routed to the destination, routing, in dependence upon content routing rules and the attributes of the new resultant medical image processing object, the new resultant data to the destination.

* * * * *